United States Patent Office 2,908,776
Patented Oct. 13, 1959

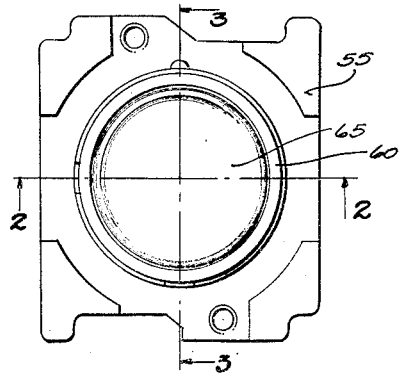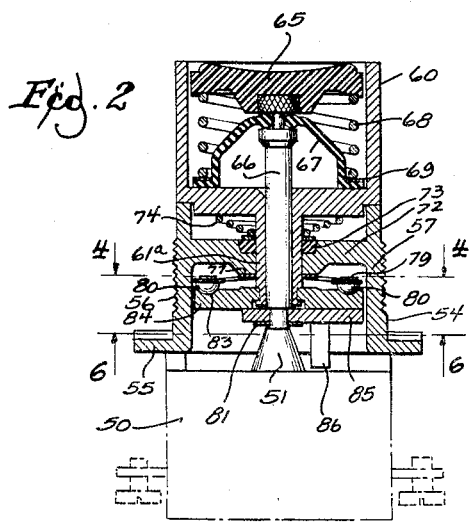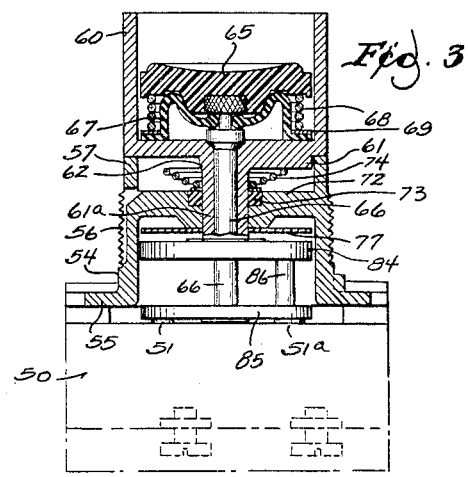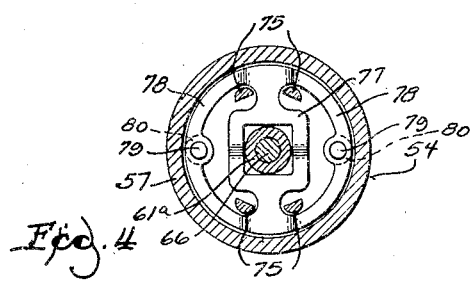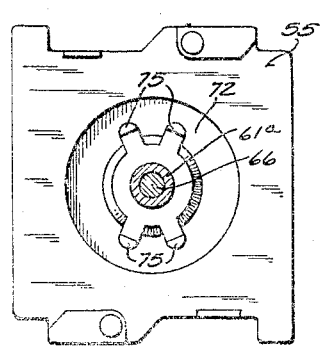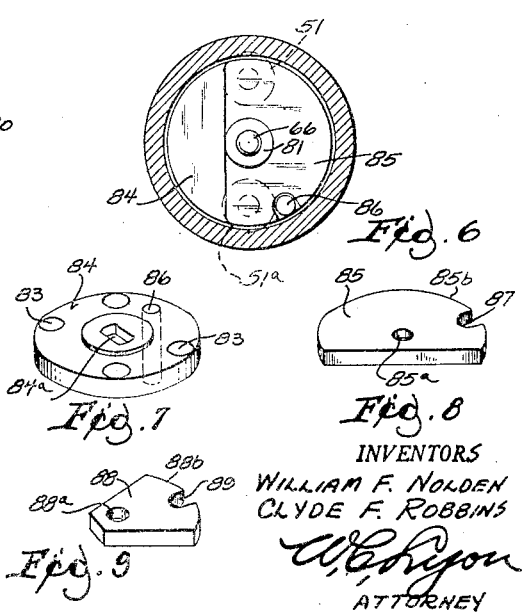
INVENTORS
WILLIAM F. NOLDEN
CLYDE F. ROBBINS
ATTORNEY

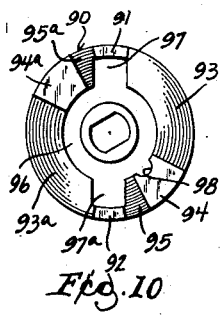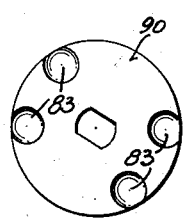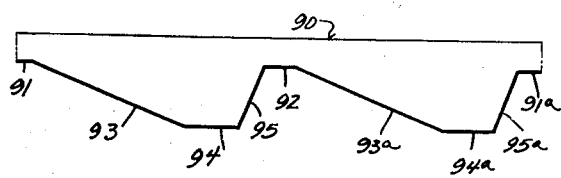
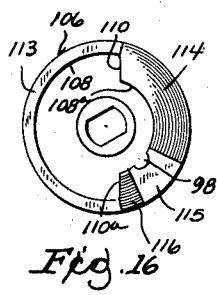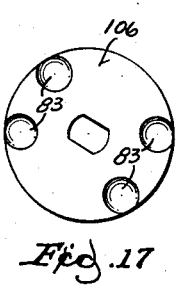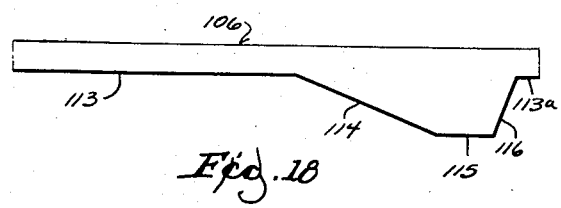
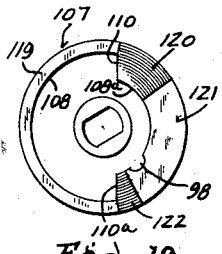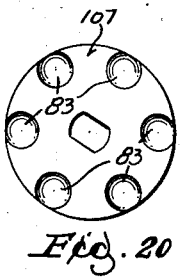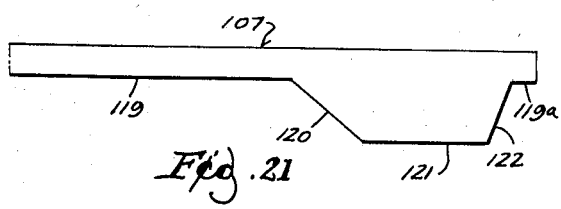
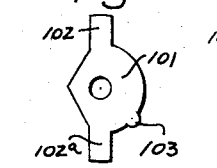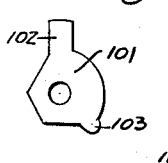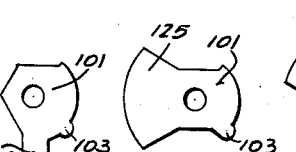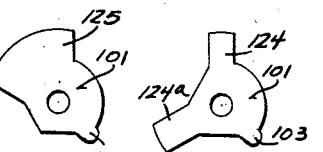
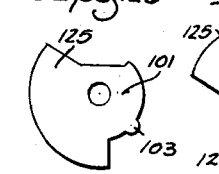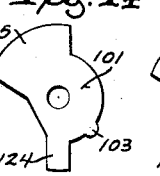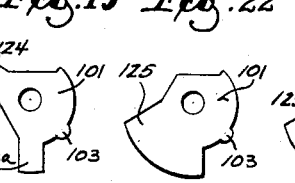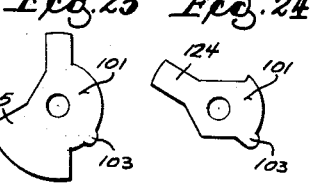
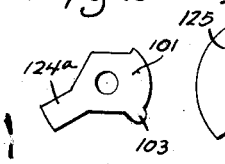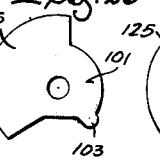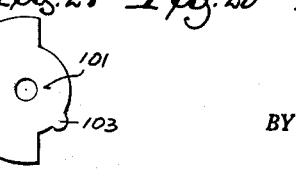

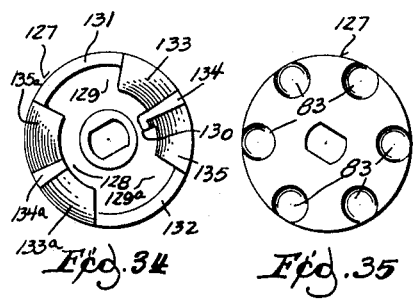
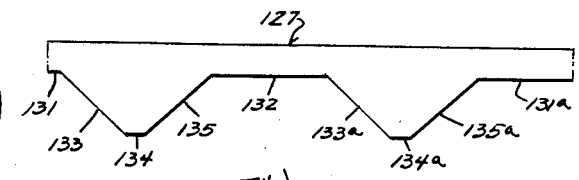
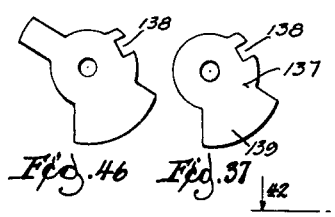
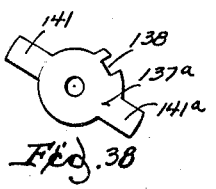
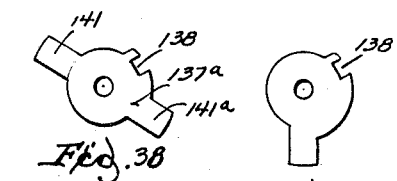
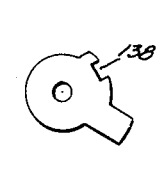
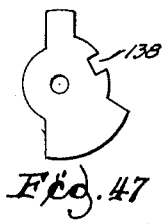
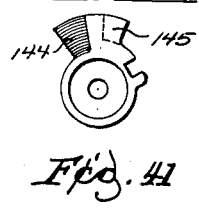
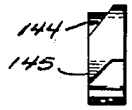
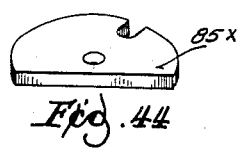
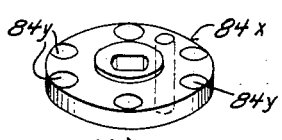
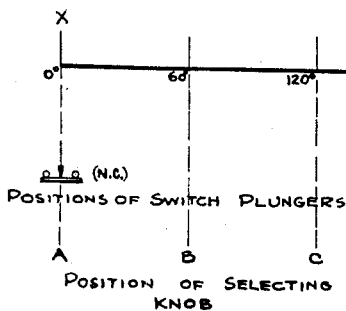
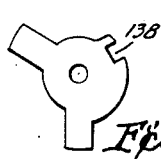
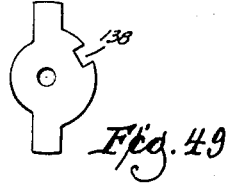

2,908,776
OPERATING MEANS FOR ELECTRIC CIRCUIT CONTROLLING DEVICES

William F. Nolden and Clyde F. Robbins, Milwaukee, Wis., assignors to Cutler-Hammer, Inc., Milwaukee, Wis., a corporation of Delaware Application February 7, 1957, Serial No. 638,777

8 Claims. (Cl. 200—4)

This invention relates to improvements in operating means for electric circuit controlling devices of the type having plural reciprocating plungers for controlling a plurality of circuits.

It is an object of the present invention to provide means for selectively operating the plunger actuated contactors of electric switches by causing reciprocation of the contactors in predetermined sequence and at predetermined times for selectively opening and/or closing one or more of a plurality of electric circuits.

Another object is to provide operating means for the multiple contactors of electric control switches in which only a relatively small number of alternatively usable parts need be provided to afford attainment of widely different sequences of contactor opening and/or closing, and differences in the timing of such actions relatively to one another.

Another object is to provide operating means for electric control switches having a plurality of bridging contactors controlling circuits to be opened and/or closed by movement of said contactors in opposite directions respectively, and in which rotary movement of a selector knob alone is capable of actuating one or more of the contactors.

Another object is to provide operating means for electric control switches having a plurality of bridging contactors controlling circuits adapted to be opened and/or closed by movement of said contactors in opposite directions selectively, and in which combined rotary and reciprocating movements of the operating means are utilized to secure variations in a given sequence of contactor operations.

Another object is to provide operating means for electric control switches having a plurality of bridging contactors opened and/or closed by reciprocation and in which an operating plate actuated by a rotatable selecting knob produces action of one or more of a plurality of contactors and of a selector plate actuated jointly by the selecting knob; and wherein reciprocation of a pushbutton produces other actions of said contactors or of other contactors of the switch not previously actuated by rotation of the selector knob.

Another and more specific object is to provide a novel combination of multiple means for insuring oiltightness of the operating means during both rotary and reciprocatory movements of the parts thereof.

Other objects and advantages of the invention will hereinafter appear.

In the drawings:

Figure 1 is a top plan view of an assembled switch-operating means constructed in accordance with the present invention;

Fig. 2 is a longitudinal cross-sectional view, on the plane of line 2—2 of Fig. 1, and with a known form of switch shown in outline;

Fig. 3 is a sectional view similar to Fig. 2, but with the section taken on the line 3—3 of Fig. 1; with certain parts in side elevation, and with the pushbutton and its associated plunger-operating plate in their depressed positions;

Fig. 4 is a transverse cross-sectional view, on the line 4—4 of Fig. 2;

Fig. 5 is a bottom plan view of the switch-operating means shown in Fig. 1, but with certain parts omitted;

Fig. 6 is a sectional view, taken substantially on the line 6—6 of Fig. 2;

Fig. 7 is a perspective view of an operating plate like that shown in place in Figs. 2, 3 and 6;

Fig. 8 is a perspective view of a selector plate, also shown in place in Figs. 2, 3 and 6;

Fig. 9 is a view, similar to Fig. 8, of a modified form of a pushbutton operated selector plate for use with the knob-operated plate shown in Figs. 2, 3, 6 and 7;

Fig. 10 is a bottom plan view of one form of operating cam plate for use in lieu of the plate shown in Fig. 7;

Fig. 11 is a top plan view of the operating cam plate shown in Fig. 10;

Fig. 12 is a linear development of the flange portions providing the cam surfaces of the operating cam plate shown in Fig. 10;

Figs. 13, 14 and 15 are plan views of alternative forms of pushbutton operated selector plates adapted for use with the operating cam plates shown in Figs. 10, 16 and 19;

Fig. 16 is a bottom plan view of a second form of operating cam plate;

Fig. 17 is a top plan view of the operating cam plate shown in Fig. 16;

Fig. 18 is a linear development of the flange portion providing the cam surfaces of the operating cam plate shown in Fig. 16;

Fig. 19 is a bottom plan view of a third form of operating cam plate;

Fig. 20 is a top plan view of the operating cam plate shown in Fig. 19;

Fig. 21 is a linear development of the flange portions forming the cam surfaces of the operating plate shown in Fig. 19;

Figs. 22 through 33 are plan views of pushbutton operated selector plates alternatively usable with the second and third forms of operating cam plates, shown in Figs. 16, 17 and 18, and in Figs. 19, 20 and 21;

Fig. 34 is a bottom plan view of a fourth form of operating cam plate;

Fig. 35 is a top plan view of the operating cam plate shown in Fig. 34;

Fig. 36 is a linear development of the flange forming the cam surfaces of the operating cam plate shown in Fig. 34;

Figs. 37 through 42, and Figs. 46 through 49, are views of selector plates alternatively usable with the fourth form of operating cam plate shown in Figs. 34, 35 and 36;

Fig. 43 is a diagrammatic illustration of the relative positions of the switch plungers and of the selecting knob, and indicating one switch of the pair as being normally open and the other switch of said pair as being normally closed, and also indicating the three possible positions (A, A', B, B', and C, C') of the selecting knob;

Fig. 44 is a modified form of the selector plate shown in Fig. 8, the peripheral notch in the plate of Fig. 44 being displaced in a counterclockwise direction through an angle of thirty degrees; and Fig. 45 is a modified form of the operating plate shown in Fig. 7, as adapted for use with the selector plate of Fig. 44.

Referring to Figs. 1, 2 and 3, the numeral 50 of Figs. 2 and 3 designates an electric switch including an insulating housing for a pair of bridging contractors, the switch preferably being of the character disclosed in our copending application Serial No. 574,828, filed March 29, 1956. The contractors may both be spring-biased to normally open position, or both may be spring-biased to normally closed position; or one contactor may be spring-biased to normally open position, and the other contactor may be spring-biased to normally closed position, if required by electric circuits to be controlled. The designation of the contactor carrying plunger shown in Fig. 2 by the numeral 51, and the designation thereof in Fig. 3 by the same reference numeral is intended to indicate that said plunger 51 carries a bridging contactor for a switch of the normally open type; whereas the plunger designated by the numeral 51a in Fig. 3 represents that said plunger may carry a contactor for a switch of either the normally open or the normally closed type. Thus the contactors severally include an insulating plunger such as 51, or 51a; either or both of which are adapted to be pressed downwardly by switch-operating means to effect engagement or disengagement of the respective bridging contactors with their associated pairs of stationary contacts, which are herein assumed, for purposes of illustration, to be of the normally open and normally closed types respectively. The insulating switch housing 50, or a plurality of such housings, connected to each other in tandem, may be attached to the cast metal member 54, for support thereby, as shown in Fig. 13 of said application, Ser. No. 574,828; or one or more of said housings may be attached to a base or wall, as shown in Fig. 14 of said application, Ser. No. 574,828. The mounting member 54 has a flange 55 adapted to be drawn against the inner surface of a suitably perforated panel, or switch box cover, by a cylindrical nut (not shown) engaging a thread 56 on a hollow cylindrical portion 57 of said member 54.

The mounting member 54 receives and supports a rotary selector knob 60 which is preferably formed of metal in cylindrical or cup-shape, with a partially cylindrical extension 61 from the bottom wall thereof, and a centrally located extension 61a of relatively small diameter; and with a central cylindrical passage through the bottom wall and through said extensions 61 and 61a. The selector knob extension 61a has its inner end formed to provide a pair of coplanar inwardly facing shoulders and a pair of flat substantially parallel surfaces extending from the shoulders to receive or accommodate various other parts interchangeably, the particular one of such parts required to obtain a desired sequence of switch operations being fixed on the knob extension for rotation therewith. The lower surface of the bottom wall of knob 60 is formed to provide a transverse shoulder 62 (see Fig. 3) for engagement with a limit stop (not shown) formed integrally with the mounting member 54 to determine two limit positions to which the knob 60 may be turned for a two position switch; the two limit positions and an intermediate position, preferably equidistant from each limit position, providing a three position switch when other combinations of contactor movement are required, as hereinafter described.

An insulating pushbutton 65 fits freely into the rotary selector knob 60 and has a cylindrical metal stem 66 extending therefrom to pass slidably through the knob extension 61a. The pushbutton stem 66 has its outer and inner end portions formed to provide shoulders or seats for other parts to be selectively placed thereon and to be permanently retained in longitudinally fixed but relative rotary positions with respect to such stem. The pushbutton stem 66 has an approximately conical resilient sealing member 67, preferably formed of silicone rubber, or a similar oilproof and waterproof material, mounted thereon adjacent the upper end thereof, with said stem 66 passing therethrough, as shown in Figs. 2 and 3. Said member 67 is adapted to seat at its inner end against the bottom wall of the cup formed by the selector knob 60; and is held in sealing engagement with said bottom wall by a helical spring 68 acting between the inner surface of the pushbutton and a peripheral flange on the seal 67, a thin metallic washer 69 being preferably interposed between said spring 68 and said flange. The seal 67 has a collapsing and expanding action between its outer and inner ends which allows the pushbutton to be manually depressed to the "down" position shown in Fig. 3, and spring 68 automatically returns the pushbutton to the "up" position shown in Fig. 2 when the pressure is released. The mounting member 54 is formed with an integral partition 72 having an aperture therein and through which the knob extension 61a projects and in which such extension is sealed in easily rotatable relation. The seal about the knob extension 61a comprises a deformable gasket 73 pressed into contact with the mounting member partition 72 and the selector knob extension 61a by a helical spring 74, of inverted frusto-conical form, to afford an oil-tight and water-tight connection between said parts.

Around the aperture through the mounting member partition 72 said partition is thickened and has formed integrally therewith four inwardly projecting fingers 75 which define the corners of a rectangle (see Figs. 4 and 5). The thickened portion of the partition 72 forms a seat for a rectangular central portion 77 of a one-piece, resilient metal leaf spring with oppositely arranged arcuate resilient portions 78, 78 (see Fig. 4); and the fingers 75 permit limited movement of portions 77, 78 of said spring on its seat. The central spring portion 77 has an opening through which the knob extension 61 and the pushbutton stem 66 extend. The arcuate spring portions 78 are provided with a pair of holes on a diameter of the spring body to receive studs 79 with hemispherical heads 80 which are adapted for simultaneous engagement within one pair of a plurality of pairs of sockets 83 (see Fig. 7) in an operating plate 84. The operating plate 84 has a central opening 84a so shaped and of such size as to be easily fitted non-rotatably onto the end portion of the selector knob extension 61 and against the seat provided therefor (see Fig. 2); and to be permanently secured thereto in the manner illustrated, so that the operating plate 84 will be retained on the knob extension even though said operating plate is under the action of the leaf spring 77, 78.

The hemispherical heads 80 of the studs 79 movably fit into one of the pairs of diametrically opposed sockets 83 in the outer surface of the operating plate 84 to releasably retain said plate in a given relationship with respect to the selecting knob projection 61 (Fig. 2). A selector plate 85 (see Figs. 2, 3, 6 and 8) is provided with a circular opening 85a arranged symmetrically with respect to the arcuate edge 85b of said plate; whereby the latter is adapted to be easily fitted onto the reduced lower end of pushbutton stem 66, and is permanently but rotatably secured thereto, as by washer 81 and a riveting operation—as best illustrated in Fig. 2—for movement of the selector plate 85 with the pushbutton stem 66 as it is pressed downwardly to the position thereof shown in Fig. 3 or raised to the position thereof shown in Fig. 2. A pin 86 extends from one side of the operating plate 84 to engage a notch 87 in the edge of the selector plate 85, to prevent rotation of selector plate 85 relatively to the knob 60 regardless of whether button 65 is manually depressed or is permitted to move to its normal upper extreme position. Fig. 9 shows a selector plate 88 having a smaller arcuate edge portion 88b than the first described selector plate 85, but having a like central opening 88a and an edge notch 89 like that shown at 87 in plate 85 (Fig. 8), and functioning a substantially similar manner.

It will be understood that the operating plate 84 and the selector plates 85 or 88 coact to change the positions of the operating plate 84 and the selector plate 85, or 88, so that the selector plate 85 or 88, when the pushbutton 65 is depressed, may bear on the selected contactor plunger or plungers. Therefore, the two contactor plungers 51, 51 may be moved at different times to close the contactors or allow the contactors to open, depending upon the position of the selector plate 85 or 88 in each instance. Inasmuch as the knob 60 may be moved to any one of three different positions; and any one of a number of different selector plates may be chosen; it is possible to secure many different combinations of movements of the contactor plungers, such as those shown at 51, 51a.

Although we have herein illustrated the use of two unlike plungers 51 and 51a, which may be assumed to respectively carry bridging contactors (not shown) to provide switches of the normally open type 51 and of the normally closed type 51a; it will be understood, from the teachings of our aforementioned co-pending application, Serial No. 574,828, filed March 29, 1956, that, alternatively, both plungers may carry bridging contactors providing switches of the normally open type, or both plungers may carry bridging contactors of the normally closed type.

Thus, assuming that one switch contactor is for a switch of the normally open type 51 and that the other contactor is for a switch of the normally closed type 51a—both of the contactor plungers will be biased to their normal upper extreme positions—which differ from each other when they are urged to the "up" position, as indicated in Figs. 2 and 3; the actions of the operating plate 84 and selector plate 85 of Figs. 7 and 8 will now be described. The selector knob 60 is now in the position in which the hemispherical heads 80, 80 of the pair of spring-pressed studs 79, 79 engage one pair of the sockets 83 and tend to retain the knob 60 in that position and both contactor plungers are respectively raised against and toward the selector plate 85 adjacent the straight edge thereof (Figs. 6 and 8). Hence, manual pressure on the pushbutton 65 will now move both plungers 51 and 51a to effect bridging engagement of one contactor with its associated pair of stationary contacts, and to effect disengagement of the other contactor from its associated pair of stationary contacts. If the selector knob 60 is now turned to the position wherein hemispherical heads 80, 80 of the pair of studs 79, 79 engage the other pair of sockets in operating plate 84, the selector plate 85 will also be turned 120° from its former position so that receiprocation of the pushbutton 65 and the selector plate 85 now act only on one plunger to open or close its contact as the case may be.

The possible variations of switch operation with the operating plate 84 and the selector plates 85 and 88, respectively, of Figs. 8 and 9 are shown in the following table:

TABLE I

| Operating Plate | Selector Plate | Knob Position | | | | Push-button Position |
|---|---|---|---|---|---|---|
| | | A | | C | | |
| | | Plunger Position | | | | |
| | | X | Y | X | Y | |
| 84 | 85 | up | up | up | up | up |
| 84 | 85 | up | down | down | down | down |
| 84 | 88 | up | up | up | up | up |
| 84 | 88 | up | down | down | up | down | in which the selecting knob 60 is to be rotated only to one or the other of the two extreme positions A and C in Table I.

Table I shows the conditions of the switch contactors when the pushbutton 65 is pressed "down," and also when it is in its normal "up" position, the switch plunger X being assumed to carry a contactor of the normally closed type and the plunger Y being assumed to carry a contactor of the normally open type, as indicated in Fig. 43. It will be noted that the same switch positions are attained in the "up" position of the pushbutton at both knob positions A and C but that different switch positions are obtained when the pushbutton is "down" at the aforementioned two knob positions.

Fig. 45 illustrates an operating plate 84x and having six equally spaced sockets 84y, like the aforementioned sockets 83 of Fig. 7; so that the operating plate 84x of Fig. 45 and the selector plate 85x of Fig. 44 could be indexed into a third position at the mid-point of rotation of the selector knob 60. If the knob 60 were moved to such third position, the selector plate 85x would be turned to be engaged with both contactor operating plungers and reciprocation of the selector plate 85x would operate the contactors associated with both plungers. Thus it will be seen that the pushbutton operating means may act on both contactor plungers or either one of them by a predetermined degree of rotation of the knob 60.

Figs. 10, 11 and 12; Figs. 16, 17 and 18; Figs. 19, 20 and 21, and Figs. 34, 35 and 36, respectively, show various forms of operating plates with cam surfaces which may be substituted for the operating plate 84 aforedescribed; which cam-surfaced plates may be used alone or in combination with various different forms of selector plates which are respectively accommodated within suitable recesses in said cam-surfaced plates for rotation with the latter, and for axial displacement with respect thereto as an incident to operation of said pushbutton 65. Thus a cam plate and a selector plate of the various types herein contemplated coact to perform the aforedescribed functions of the operating plate 84 and one or the other of the flat, pushbutton operated selector plates 85 and 88, as well as various additional functions. All of the aforementioned cam plates are preferably circular and each has a central opening with opposed flat side walls to provide a slidable and non-rotatable fit thereof onto the end of the selector knob extension 61 and to be rigidly and permanently attached thereto, as shown in Fig. 2. The upper surfaces of each of the operating cam plates have either two or three pairs of diametrically opposite sockets 83 for engagement by studs 79, 80 carried by the spring 77, 78; and all of said cam plates have a peripheral flange portion or portions extending downwardly from the lower surface thereof.

The cam plate flange portion or portions severally define recesses in the operating cam plates, and each such recess has a vertical notch or its equivalent formed therein to prevent relative rotation between the operating cam plate and a suitable form of selector plate, when the selector plate is mounted upon and rotatably and permanently attached to the pushbutton stem 67 and raised to the normal extreme position thereof under the bias of spring 68, as shown in Fig. 2.

Thus a first operating cam plate, generally designated 90 in Figs. 10, 11 and 12, has two inactive surface portions 91 and 92 while the remaining surfaces are shaped to provide for pressing down, holding, or allowing rising of the contactor-carrying plunger or plungers. Thus, the operating cam plate 90 (for one direction of rotation) has rising angled surfaces 93 and 93a for effecting depression of both of a pair of contactor-carrying plungers, such as those shown at 51, 51 in Fig. 3, for example; holding surfaces 94 and 94a, parallel to the flat base portions of the cam; and surfaces 95 and 95a are non-functional; the surfaces being named in terms of their action on the contactor plungers, such as 51, 51, of Figs. 2 and 3, for example, when the operating cam plate 90 is moving in a counterclockwise direction, with reference to the showing thereof in Fig. 10. The flange portions 91 and 92 afford clearance with respect to the plunger tips; like surfaces 93 and 93a are plunger-operating surfaces and like surfaces 94 and 94a are plunger-holding surfaces; and relative steep surfaces 95 and 95a act to release the plungers to their respective normal or biased positions.

The cam surfaces 93, 93a, 94, 94a and 95, 95a are relatively wide, so that the ends of the contactor plungers will engage the active surfaces thereof, regardless of the possible effect of manufacturing inaccuracies on the relative position of the plungers of different switches. The flange portions 91 and 92 (Fig. 10) dividing the sets of active cam surfaces assist in defining a recess with a central substantially circular portion 96 and with two diametrically opposite approximately rectangular portions 97 and 97a, the bottom walls of which are preferably in the same plane as portion 96. A vertical groove 98 (Fig. 10) is formed in one of the holding cam portions and extends from the cam surface to the recess surface in a straight line parallel to the axis of the operating cam plate.

The recess 96, 97 and 97a and the groove 98 (Fig. 10) are adapted to receive any one of the selector plates shown in Figs. 13, 14 and 15. Each of said selector plates is formed with a partially circular central portion 101 designed to slidably fit within the recessed central portion 96 of the operating plate 90; with one or a pair of substantially rectangular arms 102, 102a; and with an ear 103, so that each of said plates (of Figs. 13, 14 and 15) will fit into correspondingly shaped portions 97 of the recess and groove 98 in the operating cam plate 90.

It has been found that the operating cam plate 90 and the selector plates of Figs. 13, 14 and 15 will give the desired sequence of contactor operations to meet the requirements of many of the control circuits to which the present construction is applied in practice. Again assuming that the switch is to be operated only from a position A to a position C and, vice versa, that contactor X is normally closed and that contactor Y is normally open, the following Table II shows two examples of the conditions of such switch when the operating cam plate 90 of Fig. 10 and the selector plates of Fig. 14 and Fig. 14 are used:

TABLE II

| Operating Plate | Selector Plate, Fig. No. | Knob Position | | | | Push-button Position |
| --- | --- | --- | --- | --- | --- | --- |
| | | A | | C | | |
| | | Plunger Position | | | | |
| | | X | Y | X | Y | |
| 90 | 13 | up | up | down | down | up |
| 90 | 13 | down | down | down | down | down |
| 90 | 14 | up | up | down | down | up |
| 90 | 14 | up | down | down | down | down |

It will be noted that the switch positions shown in Table II are substantially different from those shown in Table I even though the selecting knob and the pushbutton positions are identical, and that the contactor positions are different for each condition shown in Table II.

When the first operating cam plate 90 (Figs. 10, 11 and 12) is used without any one of the pushbutton operated plates of Figs. 13, 14 or 15, each contactor-carrying plunger is actuated in a similar manner and only by manual rotation of knob 60 from one position thereof to another. Each contactor-carrying plunger returns to its upper extreme position whenever the inactive cam surfaces 91 or 92 are over the respective plungers (the plungers now rising toward the plate recesses 97 and 97a of Fig. 10, for example, but not into contact with the walls thereof). When the pushbutton operated plate of Fig. 13 is assembled with respect to the operating plate 90, each plunger will again act in the same way. Pressing of the pushbutton 65 can now close one contactor and open the other. When the pushbutton operated plates shown in Figs. 14 or 15 are used, only one plunger can be actuated by the single arm 102 or 102a, respectively; and only one contact is moved throughout its full stroke when the pushbutton 65 is depressed to its inner extreme position.

A generally similar second operating cam plate 106 and a third operating cam plate 107 are shown, respectively, in Figs. 16, 17 and 18; and Figs. 19, 20 and 21. As shown in Fig. 20, the upper surface of said operating cam plate 107 is formed with three pairs of diametrically oppositely arranged sockets 83; with the sockets spaced equally about the periphery of the plate. The lower surface of each of said operating cam plates 106 and 107 has a recess which is defined in part by circular edge portions 108, 108a and two straight edge portions 110, 110a, and by the wall of the groove 98. However, the cam surfaces of the two operating cam plates 106 and 107 are functionally quite different from each other, as shown in Figs. 18 and 21, respectively. Thus, the second operating cam plate 106 (during rotary movement of the selecting knob 60 in a clockwise direction) has an inactive surface 113 extending through 205° of the cam periphery; a plunger depressing and releasing surface 114 extending through 103°; a plunger holding surface 115 extending through 34°, and an inactive surface 116 extending through 18° of the cam plate periphery. The plunger depressing and releasing functions of cam surface 114 are reversed as an incident to reverse rotation of selecting knob 60. The third operating cam plate 107, during rotary movement of selecting knob 60 in a clockwise direction has an inactive surface 119 of 200.5°, a plunger depressing surface 120 extending through 47.5°; a plunger holding surface 121 extending through 95°; and an inactive surface 122 extending through 17° of the cam plate periphery, which functions are eliminated upon rotation of the selecting knob 60 in a counterclockwise direction.

The selector plates shown in Figs. 13, 14 and 15, and Figs. 22 through 33 can be inserted in the recess in either the second cam plate 106 or the third cam plate 107. Such selector plates are positioned by attachment thereof to the pushbutton stem for engagement of the ear 103 in the groove 98 and with their curved and straight surfaces adjacent matching surfaces of the cam recesses. As the cam plates of Figs. 16 through 21 have only one cam on the flange they can act on only one contactor plunger. The other contactor plunger will be operated—if at all—by the surface provided by the particular selector plate of Figs. 13, 14, 15 and 22 through 33 inserted in such recess, which is adapted to give the desired contactor movements under control of the pushbutton 65.

Such selector plates are all modifications of the plate 101 shown in Fig. 33, and are formed by notching said plate at none, one, or more, of the four 60° positions at the larger diameter to provide inactive portions of the plate at such notched positions. All such modified plates are adapted to fit or seat within said cam plate recesses (Figs. 10, 16 and 19) to provide for performance of a corresponding number of different electrical controlling functions.

When the second and third operating cam plates 106 and 107 (Figs. 16 and 19) are used without any of the said selector plates the cam surfaces of the operating plate will act on only one plunger as the total length of the active cam surfaces of the second plate is only 155° and that of the third cam plate is only 159.5°; whereas, the second plunger 51 or 51a lies in the 0° to 120° range. The action of the said selector plates when inserted in either operating cam plate 106 (Figs. 16–18) or 107 (Figs. 19–21), is as described in connection with the first operating cam plate, dependent upon whether or not the selector plate surface supplementing an inactive cam surface has a relatively long periphery or is narrow; so that both plunger contactors 51, or only one of the same, may bear against the particular selector plate. The rotation of either operating cam plate with a selector plate in place provides for performance of either or both of the circuit closing and/or circuit opening functions afforded by the particular cam plate, as well as the like or different circuit-controlling functions of the particular form of selector plate, according to the rotary position of the selector knob 60. This can do no more than open a normally closed contactor; but pressing the pushbutton can fully open such contactor, or can close a normally open contactor, if such contactor is the one acted upon by the selector plate.

The movements of contactor plungers X and Y are shown in the following Table III, where the second operating cam plate 106 (Fig. 16) and one of the three different selector plates of Figs. 22, 30 and 33, respectively are used and when the selector knob is rotatable only to positions A and C.

TABLE III

| Operating Plate, Fig. 16 | Selector Plate, Fig. No. | Knob Position | | | | Pushbutton Position |
|---|---|---|---|---|---|---|
| | | A | | C | | |
| | | Plunger Position | | | | |
| | | X | Y | X | Y | |
| 106 | 22 | up | up | up | down | up |
| 106 | 22 | up | up | down | down | down |
| 106 | 30 | up | up | up | down | up |
| 106 | 30 | up | up | down | down | down |
| 106 | 33 | up | up | up | down | up |
| 106 | 33 | down | down | down | down | down |

Referring to the following Table IV, it will be noted that totally different positions can be obtained in three knob positions when the third operating cam plate 107 (Fig. 19) is used with one of the selector plates.

TABLE IV

| Operating Plate | Selector Plate, Fig. No. | Knob Position | | | | | | Pushbutton Position |
|---|---|---|---|---|---|---|---|---|
| | | A | | B | | C | | |
| | | Plunger | | Plunger | | Plunger | | |
| | | X | Y | X | Y | X | Y | |
| 107 (Fig. 19) | 27 | up | up | up | down | up | down | up |
| 107 (Fig. 19) | 27 | up | down | up | up | down | down | down |

It will be understood that other switch positions are obtained when other selector plates are used with either the second or the third operating cam plate 106, or 107, so that many different combinations of contactor positions are available when the switches are operated either as a two-position or a three-position switch.

Figs. 34, 35 and 36 illustrate a fourth form of operating cam plate generally designated 127. The upper surface of such fourth operating cam plate also has three sets of diametrically oppositely positioned sockets 83 and the sockets are equally spaced about the periphery of the plate. The flange from the other surface of this fourth cam plate 127 defines a recess having a substantially circular portion 128 and having two somewhat sector-shaped inactive portions 129, 129a. One of the higher cam portions has a substantially rectangular rib 130 (Fig. 34) extending inwardly therefrom to the recess bottom and in alinement with the axis of rotation of said cam plate 127. The surfaces—defined in part by the flange portions 131, 132—comprise inactive portions 129 and 129a, each of which portions extends for 75° of the periphery of cam plate 127; plunger depressing surfaces 133 and 133a, each of a length of 47.5°; plunger holding surfaces 134 and 134a, each of 10° length, and plunger releasing or rising surfaces 135 and 135a, each of 47.5° length at the periphery of the cam plate. It will thus be apparent that both of the plungers 51 or 51a (Fig. 3) of a three-position switch are now operated simultaneously and in the same manner only if the fourth form of operating cam plate 127 and the selector plate of Fig. 38 is used.

All previous descriptions herein have been of mechanisms that provide full strokes of the plungers. Additional functional characteristics can be obtained with half strokes of the plungers when both normally open and normally closed circuits are operated by one plunger. This may be accomplished by changing the contour of the operating cam plate, or by use of a selector member, preferably a die-cast metal member, such as that shown in Figs. 41 and 42; in which the cam rise of said member is approximately one-half as great as the cam rise of the operating cam plates 106 or 107, for example, shown in Figs. 18 and 36. It will be noted that the form of the selector plate shown in Figs. 41 and 42 (when rotated in a counterclockwise direction) has a plunger depressing cam surface 144 and a plunger holding cam surface 145, which changes the contour of one of the inactive portions 129 and of one of the cam depressing surfaces 133 of the operating plate 127 (Fig. 34).

Thus in a three-position switch, upon clockwise rotary movement of operating knob 60 (Figs. 1, 2 and 3) through one knob position, one of the plungers would be pressed downwardly (or inwardly) by cam surface 144, and then held by cam surface 145 (Figs. 41 and 42). Said plunger may then be pressed inwardly to its other extreme position by depressing pushbutton 65, while the switch parts are held in said rotary position.

It is to be understood that a cam may be formed similarly to the cam of Figs. 41 and 42, but so shaped as to provide for operation of the second plunger in a similar manner.

It is also to be understood that cams similar to Figs. 41 and 42 may be provided with additional cam surfaces, similar to those shown at 144 and 145, which will modify the contour of other surfaces of operating cam plates; and that additional operating cam plates may be provided with contours other than those shown in the drawings aforementioned, for depressing or releasing a plunger or plungers upon rotation in either the clockwise or the counterclockwise direction.

The action which occurs when the selecting knob is moved clockwise occurs in the reverse sequence when the selecting knob is turned counterclockwise. Hence, one contactor plunger 51, or 51a, is given a quite different sequence of movements than the other contactor plunger when the selector plate of Figs. 41 and 42 is used; and such sequence of movements may be varied by varying the height and slope of surface 144—and the functional segmental width of the upper surface portion 145 of said supplemental cam member; which is likewise attached to the pushbutton, for reciprocatory movement by the latter in different rotary positions of the main cam member 127.

The fourth operating cam plate 127, of Figs. 34, 35 and 36, when rotated, acts on both plungers to depress the upper ends thereof to a coplanar relationship to effect simultaneous or substantially simultaneous commutation of the circuits controlled thereby. Moreover, the selector plate 137 of Fig. 37 will actuate one plunger for its full stroke when the aforementioned pushbutton 65 is manually depressed to its full inner position; and the operating knob 60 is at one extreme end of its rotation; and at the other extreme end of such rotation plate 137 of Fig. 37 when depressed in the same manner will operate the other plunger. The plate 137a of Fig. 38 will so actuate both plungers, in the intermediate or "Off" position of knob 60, when the pushbutton 65 is fully depressed.

The selector plate or member of Figs. 41 and 42, in combination with operating cam plate 127 (Figs. 34, 35 and 36), has the effect of changing the cam contour as well as causing one plunger to be actuated through part of its full stroke while the other plunger is adjacent an inactive cam surface. Hence the selector plate of Figs. 41 and 42 performs the functions of other selector plates and also changes the timing in the sequence of plunger movements and upon rotation of the selector knob only.

Table V shows the contactor positions obtainable when the fourth operating cam plate 127 is used with the selector plates of Figs. 37, 40 and 41, for a switch operating knob having three different rotary positions as shown diagrammatically in Fig. 43, and with the selecting knob moving clockwise.

selecting knob, an operating plate rigidly and non-rotatably attached to the selecting knob for rotation jointly therewith, the operating plate providing cam surfaces engageable with the contactor plungers, certain of said cam surfaces jointly defining a recess, and a selector plate permanently attached to the pushbutton for reciprocation thereby outwardly and inwardly with respect to the operating plate recess, the selector plate engaging with portions of the operating plate recess walls for rotation of the selector plate with the operating plate notwithstanding inward or outward movement of said selector plate as an incident to movement of said pushbutton, whereby a proper cooperating relationship between said operating plate and said selector plate is insured.

2. In a manually operated electric circuit controlling switching mechanism attached to a mounting member and having two or more spring-biased, plunger-actuated, contactors each urged toward one position thereof and each being movable to another position thereof by pressure applied to the plungers, the operating means for said plungers comprising a manually operable rotary selecting knob on the mounting member and rotatable to any one of a plurality of different positions relatively thereto, a pushbutton attached to and reciprocatable within the

TABLE V

| Operating Plate | Selector Plate, Fig. No. | Knob position | | | | | | Push-button Position |
|---|---|---|---|---|---|---|---|---|
| | | A | | B | | C | | |
| | | Plunger Position | | | | | | |
| | | X | Y | X | Y | X | Y | |
| 127 | 37 | up | up | down | down | up | up | up |
| 127 | 37 | down | up | down | down | up | down | down |
| 127 | 40 | up | up | down | down | up | up | up |
| 127 | 40 | up | up | down | down | up | down | down |
| ¹ 127 | 41 | up | up | up | intermediate | down | down | up |
| ¹ 127 | 41 | up | up | up | down | down | down | down |

¹ Shifted 60° CCW w/respect to knob.

Thus a large variety of contactor actions can be obtained from rotation of the selector knob only, dependent upon which of the various operating plates are used, and upon whether or not one contactor is normally open and the other contactor is normally closed; or whether the contactors are both normally open, or both normally closed. However, the various selector plates add further possibilities of contactor movements and allow the opening of a normally closed contactor merely upon rotation of the selector knob. The selector plates also provide for full stroke operation of either or both contactors by pressing on the pushbutton; depending upon the shape of the particular selector plate and its position relatively to the plungers (due to its rotation by the selecting knob). The selector plates also provide the further possibility (during assembly of the parts) of changing the contour of either or both of the cams, to change the timing of plunger actuations upon rotation of the selector knob only.

We claim:

1. In a manually operated electric circuit controlling switching mechanism attached to a mounting member and having two or more spring-biased, plunger-actuated, contactors each urged toward one position thereof and each being movable to another position thereof by externally applied pressure on the plungers, the operating means for said plungers comprising a selecting knob on the mounting member and manually rotatable in either direction to any one of a plurality of different positions relatively thereto, a pushbutton reciprocatable in the selecting knob, an operating plate rigidly and permanently attached to the selecting knob for rotation thereby and having a peripheral flange portion extending inwardly from the inner face thereof forming cam surfaces engageable with the contactor plungers and defining an inwardly opening recess, and a selector plate attached to said pushbutton and positioned within the operating plate recess for coaction with the operating plate cam surfaces and engageable with the contactor plungers, the selector plate being engaged with the operating plate for rotation therewith and coacting with the operating plate in providing surfaces at different angular positions for exerting pressures on the contactor plungers upon pressing on the pushbutton and depending upon the particular rotary position of the selecting knob.

3. In a manually operated electric circuit controlling switching mechanism attached to a mounting member and having two or more spring-biased, plunger-actuated, contactors each urged toward one position thereof and each being movable to another position thereof by pressure applied to the plungers, the operating means for said plungers comprising a manually operable rotary selecting knob on the mounting member and rotatable to any one of a plurality of different predetermined positions relatively thereto, a pushbutton reciprocatable within the selecting knob, an operating plate rigidly and permanently attached to the selecting knob for rotation thereby and having a flange forming cam surfaces engageable with one or more of the contactor plungers, and a selector plate attached to said pushbutton and having portions thereof overlying portions of the operating plate and coacting therewith for changing the position of one or more of the contactor plungers as an incident to a given degree of rotation of the selector knob and manual depression of said pushbutton.

4. In an electric circuit controlling device, in combination, a cast metal mounting member adapted for attachment to a perforated panel or the like, the outer end of said mounting member having a relatively shallow circular recess formed therein and having a stop lug formed integrally with the inner surface of the peripheral wall thereof, an operating member of substantially cylindrical form having a reduced lower end portion adapted to fit within said circular recess for rotary movement relatively thereto, said reduced lower end portion being so formed as to provide a pair of shoulders for engagement with said stop lug to positively limit the maximum range of rotary movement of said operating member, a member rigidly and non-rotatably attached to said reduced lower end portion of said operating member, said operating member having a cylindrical recess formed in the outer end thereof, an insulating pushbutton located within said last mentioned recess and normally spring-biased to a position substantially flush with the outer end of said recess, a metal stud rigidly attached to said pushbutton for movement therewith in centered relationship thereto and to said operating member, said stud having a reduced lower end portion of circular form in transverse cross section, a flat plate member having a circular opening formed therein for bearing engagement with said lower end portion of said stud for rotation relatively to the latter to which it is permanently attached, said flat plate having a notch formed therein in radial relationship to said circular opening, and means affording a positive driving connection between said member rigidly and permanently attached to said reduced lower end portion of said operating member and the walls of said notch in said flat plate.

5. In a rotatable and reciprocatable electric circuit controlling device, in combination, a cast metal mounting member adapted for attachment to a perforated panel or the like, the outer end of said mounting member having a relatively shallow circular recess formed therein and having a stop lug formed integrally with the inner surface of the peripheral wall thereof, an operating member of substantially cylindrical form having a reduced lower end portion adapted to fit within said circular recess for rotary movement relatively thereto, said reduced lower end portion being so formed as to provide a pair of shoulders for engagement with said stop lug to positively limit the maximum range of rotary movement of said operating member, said operating member having a further reduced, centrally located, downward extension of circular form in transverse cross section, said reduced lower end portion of said operating member and said further reduced downward extension thereof having an opening therethrough of circular form in cross section, said operating member having a cylindrical recess formed in the outer end thereof, an insulating pushbutton located within said last mentioned recess and normally spring-biased to a position substantially flush with the outer end of said recess, a metal stud rigidly attached to said pushbutton for movement therewith in centered relationship thereto and to said operating member, said stud having a reduced lower end portion of circular form in transverse cross section, a flat plate member having a circular opening formed therein for bearing engagement with said lower end portion of said stud for rotation relatively to the latter to which it is permanently attached, said flat plate having a notch formed therein in radial relationship to said circular opening, and means affording a positive driving connection between said member rigidly and permanently attached to said reduced lower end portion of said operating member and the walls of said notch in said flat plate.

6. In a rotatable and reciprocatable electric switching device for controlling one or more electric circuits, in combination, a mounting member, a plurality of spring-biased contactor-carrying plungers formed of insulating material and the same being independently or jointly movable to another position by pressure selectively applied to one or more of said plungers, operating means for said plungers comprising a selecting knob on the mounting member and rotatable to any one of a plurality of different preselected positions relatively thereto, a manually operable pushbutton positioned within and reciprocatable relatively to the selecting knob, an operating plate rigidly and permanently attached to the selecting knob for rotary movement therewith throughout a predetermined range, a selector plate rotatably attached to the pushbutton for reciprocation thereby, said selector plate being engaged with the operating plate for positive rotation jointly with the latter but slidable axially relatively thereto, thus selectively providing surfaces at different radial positions for exerting pressures on preselected contactor-carrying plungers upon depression of the pushbutton, depending upon the particular rotary position of the selector knob relatively to said mounting member, wherein a coiled compression spring is interposed between the inner surface of said pushbutton and the peripheral lower end flange of a flexible, substantially cone-shaped, rubber or rubber-like diaphragm the lower end of which has sealing engagement with said selecting knob, the reduced upper end of which diaphragm has sealing engagement with said pushbutton, and a flat, centrally perforated, spring-pressed, sealing washer of rubber or rubber-like material interposed between a part of said selector knob and a part of said mounting member through which said knob part is adapted to project.

7. In a rotatable and reciprocatable electric switching device for controlling one or more electric circuits, in combination, a mounting member, a plurality of spring-biased contactor-carrying plungers formed of insulating material and the same being independently or jointly movable to another position by pressure selectively applied to one or more of said plungers, operating means for said plungers comprising a selecting knob on the mounting member and rotatable to any one of a plurality of different preselected positions relatively thereto, a manually operable pushbutton positioned within and reciprocatable relatively to the selecting knob, an operating plate rigidly and permanently attached to the selecting knob for rotary movement therewith throughout a predetermined range, a selector plate rotatably attached to the pushbutton for reciprocation thereby, said selector plate being engaged with the operating plate for positive rotation jointly with the latter but slidable axially relatively thereto, thus selectively providing surfaces at different radial positions for exerting pressures on preselected contactor-carrying plungers upon depression of the pushbutton, depending upon the particular rotary position of the selector knob relatively to said mounting member, wherein a coiled compression spring is interposed between the inner surface of said pushbutton and the peripheral lower end flange of a flexible, substantially cone-shaped, rubber or rubber-like diaphragm the lower end of which has sealing engagement with said selecting knob, the reduced upper end of which diaphragm has sealing engagement with said pushbutton, a flat, centrally perforated, spring-pressed, sealing washer of rubber or rubber-like material interposed between a part of said selector knob and a part of said mounting member through which said knob part is adapted to project, and wherein a rubber or rubber-like sealing member surrounds an outwardly projecting portion of said mounting member and is seated against an outwardly facing surface thereof, to afford an oil-tight connection between said member and the inner surface of a perforated panel or the like to which said device may be attached.

8. In a convertible type of manually operated electric circuit controlling switching mechanism attached to a mounting member and having two or more spring-biased, plunger-actuated, contactors each urged toward one position thereof and each being movable to another position thereof by pressure applied to the plungers, the operating means for said plungers comprising a manually operable rotary selecting knob on the mounting member and rotatable to any one of a plurality of different predetermined positions relatively thereto, a pushbutton reciprocatable within the selecting knob, an operating plate rigidly secured to the selecting knob for rotation thereby and having a flange forming cam surface engageable with one or more of the contactor plungers, and a selector plate attached to said pushbutton and having portions thereof overlying portions of the operating plate and coacting therewith for changing the position of one or more of the contactor plungers as an incident to a given degree of rotation of the selector knob and depression of said pushbutton, the aforementioned structure forming a switching mechanism which is operable to depress one or more of the contactor plungers with rotation of said selecting knob, and means for converting said switching mechanism so that one or more of the contactor plungers may be depressed only upon depression of said pushbutton, the last mentioned means comprising an operating plate which may be substituted for the first mentioned operating plate and having a substantially flat inner surface and secured to said selecting knob for rotation thereby, and a selector plate which may be substituted for the first mentioned selector plate being rotatably attached to the pushbutton for reciprocation thereby and having interlocking engagement with the last mentioned operating plate for rotation thereby, the last mentioned operator plate and the last mentioned selector plate coacting to provide surfaces at different angular positions for exerting pressure on one or more of the contactor plungers upon depressing the pushbutton and dependent upon the particular rotary position of the selecting knob.

References Cited in the file of this patent

UNITED STATES PATENTS

| | | |
|---|---|---|
| 2,357,973 | Robbins | Sept. 12, 1949 |
| 2,488,982 | Mekelburg | Nov. 22, 1949 |
| 2,707,213 | Koertge | Apr. 26, 1955 |
| 2,722,573 | Frank | Nov. 1, 1955 |